United States Patent Office 3,503,397
Patented Mar. 31, 1970

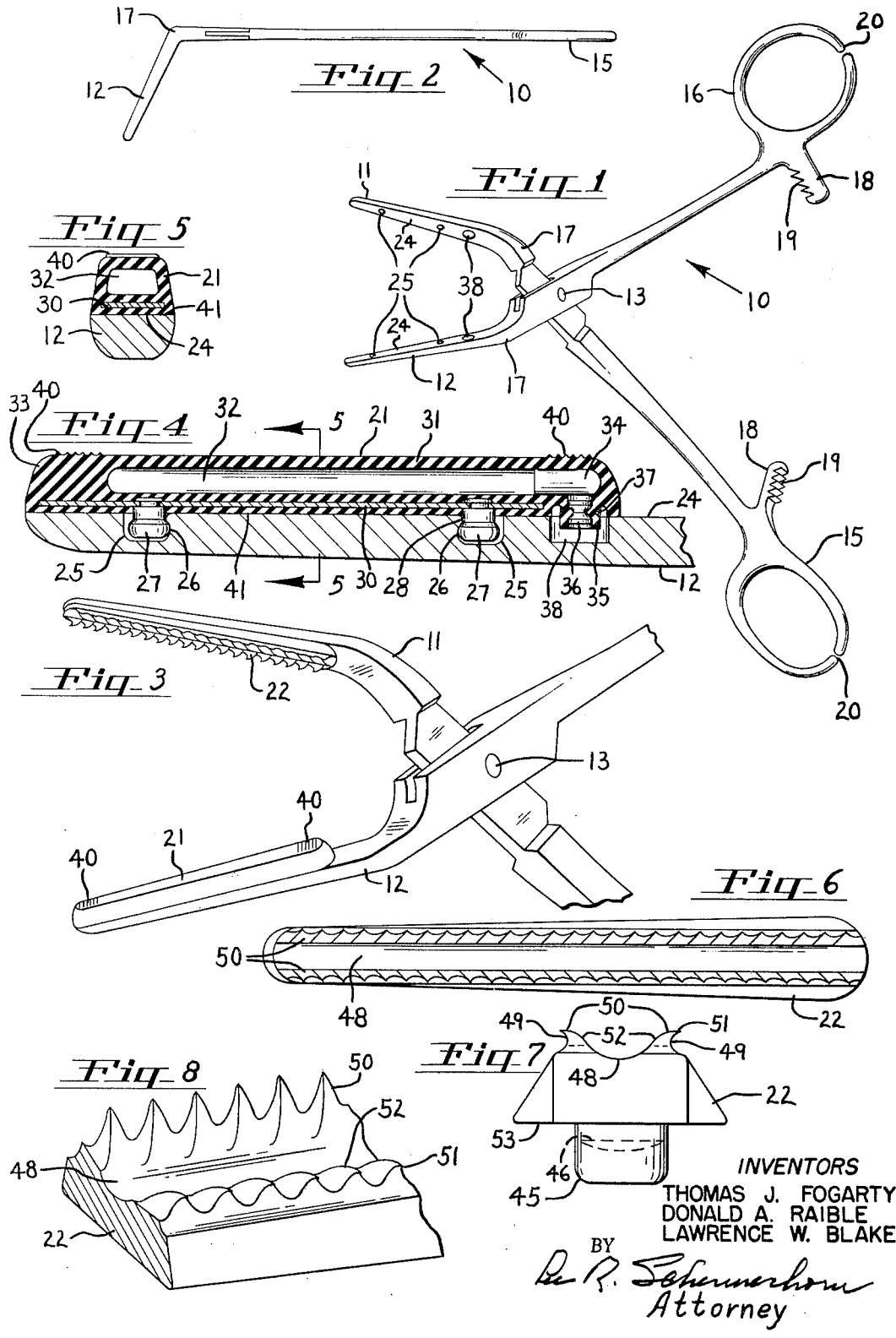

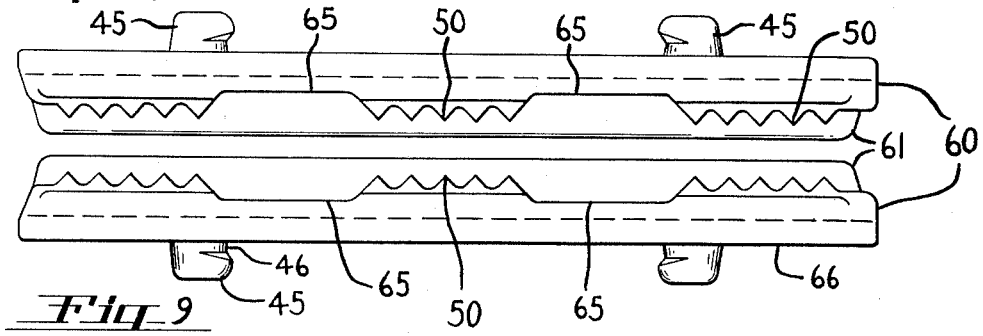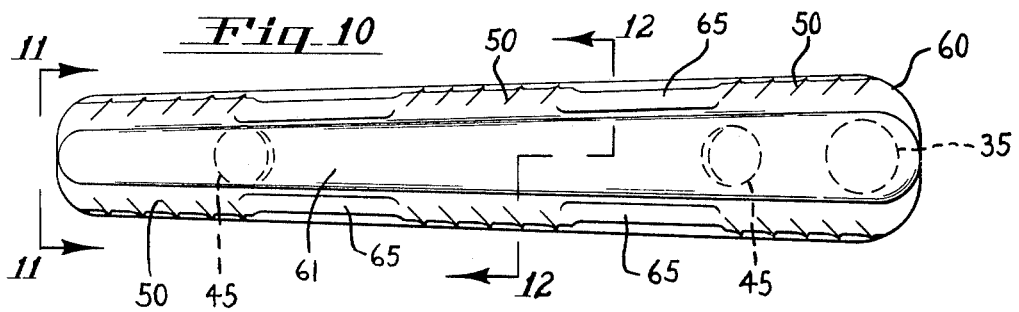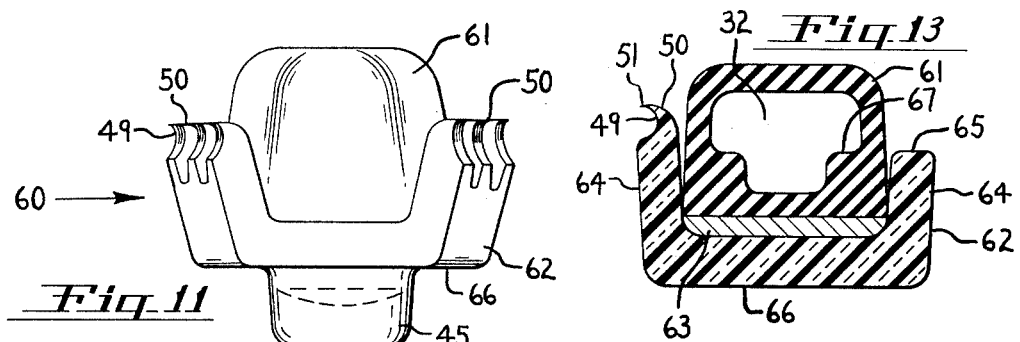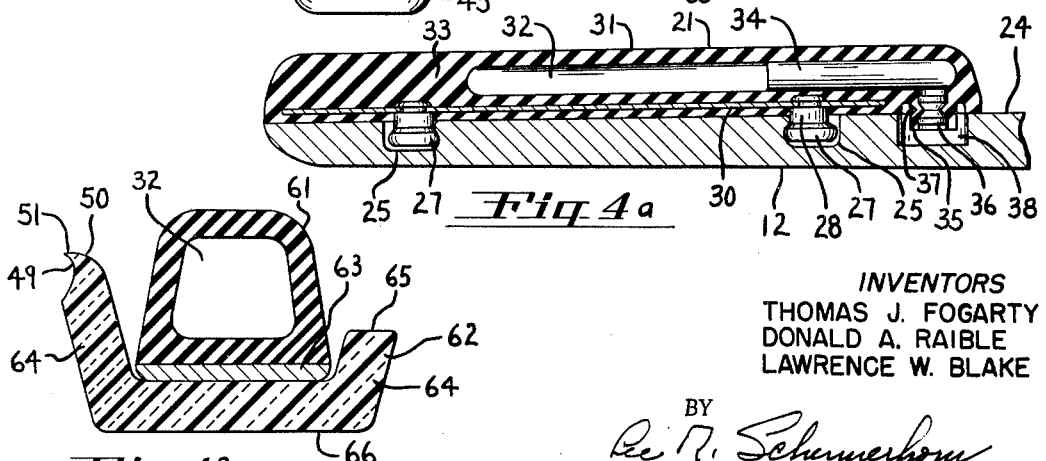

3,503,397
ATRAUMATIC SURGICAL CLAMP
Thomas J. Fogarty, Portland, Oreg., and Donald A. Raible, Corona, and Lawrence W. Blake, Huntington Beach, Calif.; said Raible and said Blake assignors, by mesne assignments, to American Hospital Supply Corporation, Evanston, Ill., a corporation of Illinois
Continuation-in-part of application Ser. No. 486,266, Sept. 10, 1965. This application Sept. 21, 1967, Ser. No. 669,443
Int. Cl. A61b 17/28, 17/12
U.S. Cl. 128—322                    18 Claims

ABSTRACT OF THE DISCLOSURE

A clamp having a pair of clamp jaws with interchangeable hard and soft jaw inserts, or combined hard and soft jaw inserts, to apply traction and/or occlusiveness of a vessel. The hard jaw element is equipped with obliquely directed teeth in herringbone pattern for bi-directional traction while the soft jaw element comprises a resilient hydraulic jacket or pad containing liquid. A novel type of snap fastener is provided for detachably mounting the inserts on the jaws of a clamp.

CROSS-REFERENCES TO RELATED APPLICATIONS

This application is a continuation-in-part of co-pending application Ser. No. 486,266, filed Sept. 10, 1965, for "Atraumatic Clamp for Vascular Surgery." This application contains the same disclosure as Ser. No. 669,442, filed concurrently herewith on Sept. 21, 1967.

BACKGROUND OF THE INVENTION

This invention relates to a surgical clamp.

Surgical clamps have heretofore been provided with metal teeth in the opposite jaws directed toward each other. Such teeth inflict considerable damage to the vascular structure or other tissue to which they are applied. Some of this damage is immediate while some of the damage is of a continuing nature over the long term. Solid rubber jaws have also been proposed and tubular rubber covers have been proposed for metal jaws. A tourniquet type of clamp equipped with an air inflatable rubber bag or bladder has also been proposed. These prior art devices do not adequately supply the needs of modern surgery, particularly in the vascular field.

SUMMARY OF THE INVENTION

The clamp of the present invention comprises a pair of metal jaws adapted to receive interchangeable inserts to meet the needs of the surgeon in different types of operations. For this purpose three different types of inserts are provided: hard jaw, soft jaw and combination hard and soft jaw.

The hard jaw insert is preferably made of a hard plastic equipped with two rows of teeth extending along opposite sides of the insert directed at oblique angles outwardly and away from the distal end of the jaw in herringbone pattern. This arrangement of the teeth provides effective traction in opposite directions laterally of the jaw and in a longitudinal direction to resist slippage of a clamped vessel out of the clamp in any direction. The top surfaces of the teeth are rounded to present a blunt clamping surface which does not penetrate the clamped vessel or object unless forceful traction is applied.

In the soft jaw insert, a chamber in a rubber jacket or pad is completely filled with liquid. When a vessel or other object is clamped intermediate the ends of the pad, the portion of the pad in contact with the vessel is deformed and applies uniform clamping pressure over all areas of mutual engagement between the pad and the vessel or object. The displaced liquid causes other portions of the jacket to expand or stretch as a result of the resilient nature of the jacket material.

In the combination jaw insert, the intent is to further tailor a pair of jaw inserts to vessels of a selected size range. The combination jaw insert is configured to provide the softness of the fluid filled pad in one or more longitudinal locations, such areas being located between regions of greater lateral stability and traction, characteristic of the hard jaw insert. Two methods of achieving these objectives are described: In the first, the hydraulic jacket, or pad, lies between two marginal rows of teeth. These teeth are constructed as in the hard jaw insert except that gaps are provided in the continuity of the teeth for optional exclusively soft jaw clamping. At the same time, the hard jaw teeth prevent slippage along the jaws in a longitudinal direction. A further function of the structure supporting the marginal rows of teeth is to limit lateral distortion of the fluid filled jacket, thus stiffening the hydraulic jacket, increasing lateral stability.

In an alternate design, the objectives of the combination jaw insert are met solely by foreshortening the fluid filled volume of a jaw insert, otherwise identical to the above noted soft jaw insert. This foreshortening serves both to limit longitudinal slip by interference with the solid portion of the rubber jaw insert and to increase lateral stability. The latter is effected by the reduction in volume of the fluid filled portion and by proximity of the clamping portion of the jaw insert to the solid rubber portion.

Objects of the invention are to provide a surgical clamp which is less injurious to the tissue of the patient than existing clamps, to provide a clamp which has improved effectiveness for both traction and occlusion purposes, to provide interchangeable inserts which afford the surgeon a choice of instrumentalities, to provide an improved hard jaw insert, to provide an improved soft jaw insert, to provide a combination insert, to provide convenient interchangeability so that the surgeon may use the inserts in any desired combination, to provide a toothed jaw insert which avoids concentration of clamping force on a few teeth with high localized pressure, to provide desired traction and occlusiveness while leaving no evidence of damage to the vascular structure or other tissue, and to provide improvements which reduce the manufacturing cost so that the inserts may be treated as disposable items.

The invention will be better understood and additional objects and advantages will become apparent from the following detailed description of certain preferred embodiments illustrated in the accompanying drawings. Various changes may be made, however, in the details of construction and arrangement of parts and certain features may be used without others. All such modifications within the scope of the appended claims are included in the invention. While the invention will be described with particular reference to the clamping of veins and arteries in vascular surgery, it is to be understood that certain features of the invention are also applicable to obstetric forceps and other tissue clamping instruments.

BRIEF DESCRIPTION OF THE DRAWINGS

FIGURE 1 is a perspective view of a clamp which is adapted to receive different types of jaw inserts;

FIGURE 2 is a side elevational view of the clamp in FIGURE 1;

FIGURE 3 is an enlarged fragmentary view of a portion of FIGURE 1, showing the clamp equipped with one hard jaw insert and one soft jaw insert;

FIGURE 4 is an enlarged longitudinal sectional view of the jaw in FIGURE 3 which is equipped with a soft jaw insert;

FIGURE 4a shows a modification of the soft jaw insert in FIGURE 4;

FIGURE 5 is a view on the line 5—5 in FIGURE 4;

FIGURE 6 is an enlarged bottom plan view of the hard jaw insert in FIGURE 3;

FIGURE 7 is a still further enlarged end view of the hard jaw insert in FIGURE 6;

FIGURE 8 is a fragmentary perspective view of the hard jaw insert in FIGURES 6 and 7;

FIGURE 9 is an enlarged side elevation view of a pair of combination hard and soft jaw inserts disposed in operative relation but removed from the clamp;

FIGURE 10 is a top plan view of the lower combination insert in FIGURE 9;

FIGURE 11 is a further enlarged end view on the line 11—11 in FIGURE 10;

FIGURE 12 is a view on the offset line 12—12 in FIGURE 10; and

FIGURE 13 is a view similar to FIGURE 12, showing a modification.

DESCRIPTION OF THE PREFERRED EMBODIMENTS

The clamp 10 in FIGURE 1 comprises a pair of similar metal jaws 11 and 12 hinged together at 13 for movement toward and away from each other. A sliding movement rather than a pivotal movement may be provided if desired. The jaw 11 is integral with a handle portion 15 and the jaw 12 is integral with a handle portion 16 to provide scissors action for opening and closing the jaws. The jaws may be bent at 17 to a considerable angle relative to the pivotal and handle portions as shown in FIGURE 2. The handles have lugs 18 equipped with inter-engaging ratchet teeth 19 to lock the jaws in closed or partially closed positions. The finger rings in the handles may be split as indicated at 20, if desired. This allows the clamp to be supported by the cover sheet on the patient by pressing a fold of the sheet into the ring through a slight gap at one of the points 20.

FIGURE 3 shows the jaw 12 equipped with a soft jaw insert 21 and the jaw 11 equipped with a hard jaw insert 22. Each jaw has a flat seating face 24 containing a pair of longitudinally spaced sockets 25 for the detachable mounting of these inserts. As shown in FIGURE 4, the sockets 25 are slightly undercut on their adjacent sides as indicated at 26 to receive buttons 27 on the insert 21 with a resilient snap fit. Undercut portion 26 in each socket leaves a neck or ledge portion 28 for retention of the button, the two buttons being tensioned toward each other by the resilience of the insert in each case. The buttons have rounded heads with reduced neck portions which fit the undercut and neck portions 26 and 28 of the sockets.

The buttons 27 on soft jaw insert 21, which are preferably of stainless steel, are riveted in openings in a stainless steel reinforcing strip 30. The resilience of strip 30 allows the buttons to spring apart slightly in entering the sockets 25 and then snap into the undercut portions 26 of the sockets for firm retention when the insert is pressed against jaw seating face 24. The spring action of strip 30 pulls the two buttons toward each other to lock both in the sockets. The insert is removed by introducing a fingernail or thin instrument between the bottom of the insert and the jaw and prying the insert toward adjacent one of the ends. The release of one button automatically releases the other button from its socket.

Soft jaw insert 21 comprises a hollow resilient rubber hydraulic jacket 31, in the bottom wall of which is embedded the reinforcing strip 30. Throughout most of its length the jacket 31 is hollow to provide a chamber 32 for a suitable liquid such as glycerin. The distal end portion of the jacket comprises solid resilient rubber at 33. The proximal end of chamber 32 is filled with a solid resilient rubber plug 34.

The resilience of the soft jaw insert can be tailored to various clamping requirements by appropriately configuring the shape of the hollow jacket. This is illustrated in FIGURE 13 by the internal ridges 67 which serve to increase lateral stability of the hydraulic jacket and prevent bottoming of the clamped vessel against the unyielding base of the jaw. Ridges 67 form a chamber of T-shape.

For removing the core which forms the chamber 32 when the jacket is molded, the jacket is provided at its proximal end with a short tubular neck 35. After inserting plug 34, this neck is closed with an hourglass shape plastic plug 36 which is retained and sealed by an external suture winding 37. Each clamp jaw 11 and 12 is provided with a shallow recess 38 to accommodate this protruding neck structure. A suitable liquid such as glycerin is introduced into chamber 32 through holes in buttons 27 which are then plugged.

The clamping surface on each end portion of the jacket is provided with tread ridges 40 extending in a transverse direction. The ridges 40 on the distal end overlie the solid rubber portion 33 while the ridges on the proximal end overlie the plug 34. The bottom wall of the jacket has a flat seating face 41 to seat on seating face 24 of the clamp jaw.

In FIGURE 4a the solid rubber end portion 33 and rubber plug 34 are extended to shorten the liquid chamber 32. These end portions of the jacket being less soft than the central chambered portion tend to hold a small vessel centered between the ends so that it will not slip lengthwise of the jaws.

The details of construction of hard jaw insert 22 are shown in FIGURES 6 to 8. This insert is preferably molded in its entirety of a suitable relatively hard plastic such as polyphenylene oxide. For convenience in molding, the buttons 45 instead of being symmetrical like the buttons 27, may be undercut and necked only on their adjacent sides at 46 as best shown in the embodiment in FIGURE 9. Alternatively, to increase strength and wear resistance of the buttons 45, they may be made of suitable metal and molded in place in the jaw insert 22. The plastic material of the insert provides the necessary spring action to pull the buttons toward each other to lock them in their sockets as described in connection with FIGURE 4.

The clamping face of insert 22 comprises two parallel rows of outwardly directed teeth 50 providing a concave recess or depression 48 between the two rows. These teeth are disposed in herringbone pattern with their points 51 directed away from the distal end of the insert and at approximately 45° angles to the longitudinal axis of the insert. The upper surfaces of the teeth are rounded at 52 so as to present blunt clamping surfaces to an object in the jaws of the clamp. This arrangement of the teeth allows them to exert traction longitudinally of the jaw in one direction and transversely of the jaw in opposite directions with a minimum amount of damage to clamped tissue. The teeth are referred to as bi-directional.

In order to provide the described blunt and non-pentrating clamping surface and at the same time provide penetration in traction, the outer sides of the teeth are undercut as indicated at 49 in FIGURE 7. The depth of the undercut may be varied according to the amount of traction required and the size of the vessel to be clamped. When the clamp is to be used for side clamping, maximum traction is required. In such case the undercut may be deepened and the teeth directed at angles of 90° from the long axes of the clamp jaw.

The plastic material of insert 22 has sufficient resilience to produce the same snap acting engagement and disengagement of buttons 45 with the jaw sockets 25 as described in connection with the steel buttons 27 on insert 21. Buttons 45 protrude from a flat seating face 53 which seats on a face 24 of the clamp jaw.

FIGURES 9 to 12 illustrate the details of construction of a combination hard and soft jaw insert 60. This insert comprises a soft jaw element 61 and a hard jaw element 62. Soft jaw element 61 is essentially similar to the soft jaw insert 21 except that it lacks the attachment buttons 27 and instead of containing a metal reinforcing strip 30 within a wall of its jacket, the base side of the jacket is bonded to a metal strip 63. Strip 63 is in turn bonded in a longitudinal channel in hard jaw element 62. Channel element 62 is preferably molded of a suitable hard plastic as described in connection with jaw insert 22. Buttons 45 protrude from a flat seating face 66.

The side portions of element 62 comprise a pair of upstanding and slightly outwardly flaring flanges 64 equipped with teeth 50 in herringbone pattern as described in connection with FIGURES 6 to 8. The teeth are interrupted, however, to provide two spaces 65 without teeth in each flange 64. In FIGURE 13 the side flanges 13 are of less flaring shape and this feature in combination with the previously described internal ridges 67 provides improved lateral stability.

Thus, a vein or artery or other tube may be clamped for occlusive purposes in one of the spaces 65 where it will not be engaged by the teeth 50. FIGURE 9 shows two of the combination insert 60 in juxtaposition as they would be in a clamp in nearly closed position. A vessel disposed in one of the spaces 65 would be engaged solely by the hydraulic pads 61 and would not be engaged by the teeth 50. However, if the vessel is shifted to the center of the clamp, it will be engaged by the teeth 50 as well as the hydraulic pad 61 for both occlusion and traction.

The three types of jaw inserts are interchangeable in the clamp 10. A soft jaw insert 21 may be used with a hard jaw insert 22 as shown in FIGURE 3. Two soft jaw inserts may be used together or two hard jaw inserts may be used together. The combination hard and soft jaw inserts 60 may be paired as in FIGURE 9 or one of the inserts 60 may be paired with an insert 21 or an insert 22. This provides the surgeon with complete flexibility in the selection of jaw inserts.

In the soft jaw insert 21 and the soft jaw element of the combination insert 60, the clamping action of the hydraulic jacket is superior to the clamping action of a conventional rubber jaw insert or covering. A plain rubber clamping element applies the greatest pressure where the rubber is distorted most and applies a lesser pressure on areas where the rubber is distorted less. Such a clamping element, even though soft, may crack or break hard and brittle plaques in a blood vessel because excessive pressure is concentrated over a small area.

The present hydraulic jacket, on the other hand, distributes the applied pressure uniformly over the whole surface of the vessel engaged by the jacket without any concentration of pressure at the point of greatest deflection of the jacket. This is a characteristic of hydraulic pressure as distinguished from the pressure distribution pattern of a resilient solid material such as rubber. A hard plaque in the blood vessel will prevent complete occlusion of the vessel by a hard jaw member and may even prevent complete occlusion with an ordinary rubber cushion unless excessive pressure is applied. The present hydraulic jacket will conform freely to the shape of the plaque and occlude the vessel without crushing the plaque. This is of great importance in vascular surgery. This clamping element is also capable of accommodating a tube or catheter inserted and manipulated through the vessel, maintaining vessel occlusiveness by its ability to conform to the resisting body.

When a soft jaw insert is paired with a hard jaw insert as in FIGURE 3, the clamped vessel is deflected into depression 48 to effect occlusion with a minimum of clamping pressure.

The solid rubber end portions 33 and 34 in the insert 21 are less yieldable than the mid portion in the region of chamber 32 whereby a clamped object is retained in the space between the end portions. Tread ridges 40 further inhibit slippage of the clamped object off the ends of the insert. Solid end portions 33 and 34 may be lengthened or shortened as shown in FIGURES 4 and 4a, according to the size of vessel to be clamped.

All three types of jaw inserts are conveniently sterilizable by autoclaving or gas for re-use if desired. However, an important advantage of the present forms of construction is the low cost of manufacture whereby the inserts are economically disposable after a single use if cleaning and sterilization are not desired.

Having now described our invention and in what manner the same may be used, what we claim as new and desire to protect by Letters Patent is:

1. An insert for a surgical clamp comprising a channel member having toothed side flanges, a resilient pad mounted in the trough of said channel member between the two rows of teeth on said side flanges, and means on said channel member for detachably mounting the insert on the jaw of a clamp.

2. An insert as defined in claim 1, said pad comprising a resilient hydraulic jacket having a chamber therein filled with liquid.

3. An insert as defined in claim 1, portions of said flanges being recessed and without teeth.

4. An insert as defined in claim 1, said teeth being oriented at approximately 45° to the direction of said channel member in herringbone pattern.

5. An insert as defined in claim 1, said teeth being directed outwardly and shaped to present a blunt, non-penetrating clamping surface.

6. A surgical clamp comprising a pair of elongated jaws connected together for movement toward and away from each other, at least one of said jaws having two longitudinal rows of teeth, and a resilient pad mounted between said two rows of teeth.

7. A clamp as defined in claim 6, said teeth and pad being incorporated in an insert, and means on said insert and said one jaw for detachable mounting of said insert on said one jaw.

8. An insert for a surgical clamp comprising an elongated resilient hydraulic jacket having a chamber therein filled with liquid, said liquid chamber terminating a distance short of the ends of said jacket, said chambered portion of the jacket being softer and more yieldable than its end portions to hold a clamped vessel centered between said end portions, and ridges on the clamping face of said end portions of the jacket.

9. An insert for a surgical clamp comprising an elongated resilient hydraulic jacket having a chamber therein filled with liquid, said liquid chamber terminating a distance short of the ends of said jacket, said chambered portion of the jacket being softer and more yieldable than its end portions to hold a clamped vessel centered between said end portions, said jacket having a pair of longitudinal ridges in said chamber forming a chamber of T-shape.

10. An insert for a surgical clamp comprising an elongated resilient hydraulic jacket having a chamber therein filled with liquid, said liquid chamber terminating a distance short of the ends of said jacket, said chambered portion of the jacket being softer and more yieldable than its end portions to hold a clamped vessel centered between said end portions, a tubular neck on one of said end portions of the jacket, a plug in said neck, and a plug in said chamber in said one end portion.

11. An insert for a surgical clamp comprising an elongated resilient hydraulic jacket having a chamber therein filled with liquid, said liquid chamber terminating a distance short of the ends of said jacket, said chambered portion of the jacket being softer and more yieldable than its end portions to hold a clamped vessel centered between said end portions, a channel member, said hydraulic jacket being mounted in the trough of said channel member, and said channel member having toothed flanges on opposite sides of said jacket.

12. An insert as defined in claim 11, portions of said flanges being recessed and without teeth.

13. An insert as defined in claim 11, said teeth being directed outwardly and shaped to present a blunt, non-penetrating clamping surface.

14. An insert as defined in claim 13, said teeth being oriented at 45° to the direction of said channel in herringbone pattern.

15. An insert as defined in claim 11 including means on said channel member for detachable mounting on a jaw of a clamp.

16. An insert for a surgical clamp comprising an elongated member having two longitudinal rows of teeth directed outwardly and toward one end of said member in herringbone pattern for exerting traction longitudinally of said member in one direction and transversely of said member in opposite directions, said teeth being shaped to present blunt and non-penetrating clamping surfaces to a clamped object, said teeth being formed on the side flanges of a member of channel shape, and a resilient hydraulic jacket mounted in the trough of said channel between said two rows of teeth.

17. An insert as defined in claim 16, said side flanges having recessed portions without teeth.

18. An insert for a surgical clamp comprising an elongated member having two longitudinal rows of teeth directed outwardly and toward one end of said member in herringbone pattern for exerting traction longitudinally of said member in one direction and transversely of said member in opposite directions, said teeth being shaped to present blunt and non-penetrating clamping surfaces to a clamped object, and means on said member for detachable mounting on a jaw of a clamp.

References Cited

UNITED STATES PATENTS

| | | | |
|---|---|---|---|
| 2,637,320 | 5/1953 | Greenberg | 128—324 |
| 2,645,013 | 7/1953 | Mathison | 128—321 X |
| 2,743,726 | 5/1956 | Grieshaber | 128—321 |
| 2,796,065 | 6/1957 | Kapp | 128—346 |
| 2,861,574 | 11/1958 | Braslow | 128—327 |
| 3,140,715 | 7/1964 | Whitton et al. | 128—321 |

DALTON L. TRULUCK, Primary Examiner

U.S. Cl. X.R.

24—243; 81—421; 128—346